(12) United States Patent
Geilen et al.

(10) Patent No.: US 7,741,403 B2
(45) Date of Patent: Jun. 22, 2010

(54) PVC PLASTISOLS COMPRISING EFFECT PIGMENTS, THEIR PREPARATION AND USE IN COIL COATING

(75) Inventors: Stefanie Geilen, Münster (DE); Paul Davies, South Wirral (GB)

(73) Assignee: BASF Corporation, Muenster (DE)

( * ) Notice: Subject to any disclaimer, the term of this patent is extended or adjusted under 35 U.S.C. 154(b) by 287 days.

(21) Appl. No.: 10/598,404

(22) PCT Filed: Feb. 23, 2005

(86) PCT No.: PCT/EP2005/050944

§ 371 (c)(1),
(2), (4) Date: Apr. 2, 2007

(87) PCT Pub. No.: WO2005/082990

PCT Pub. Date: Sep. 9, 2005

(65) Prior Publication Data
US 2007/0289498 A1    Dec. 20, 2007

(30) Foreign Application Priority Data
Mar. 1, 2004    (GB) .................... 0404588.6

(51) Int. Cl.
*C08L 27/06* (2006.01)
*C08K 5/10* (2006.01)

(52) U.S. Cl. ...................... 524/569; 524/315

(58) Field of Classification Search ................ 524/569
See application file for complete search history.

(56) References Cited

U.S. PATENT DOCUMENTS

| | | | |
|---|---|---|---|
| 3,326,831 A | 6/1967 | Aviges | |
| 4,097,558 A | 6/1978 | Kuhn | |
| 4,881,999 A | 11/1989 | Balmer et al. | |
| 5,223,322 A * | 6/1993 | Colyer et al. | 428/141 |
| 5,248,723 A | 9/1993 | Murase | |
| 5,695,696 A * | 12/1997 | Hensler et al. | 264/21 |
| 5,837,347 A * | 11/1998 | Marecki | 428/143 |
| 5,994,439 A | 11/1999 | Masuda et al. | |
| 6,162,504 A * | 12/2000 | Hubert et al. | 427/386 |
| 6,228,925 B1 * | 5/2001 | Pedersen et al. | 524/458 |
| 2002/0187341 A1 * | 12/2002 | Ko et al. | 428/343 |
| 2004/0115398 A1 * | 6/2004 | Regelski et al. | 428/141 |
| 2004/0167253 A1 | 8/2004 | Butschbacher | |

FOREIGN PATENT DOCUMENTS

| | | |
|---|---|---|
| CA | 2136290 A1 | 5/1995 |
| CH | 570866 | 12/1975 |
| EP | 0587104 A2 | 3/1994 |
| EP | 0654500 A1 | 5/1995 |
| GB | 1168233 | 10/1969 |
| WO | 97/23349 | 12/1995 |
| WO | 03/002645 A1 | 1/2003 |

OTHER PUBLICATIONS

English Abstract for WO97/23349.

* cited by examiner

*Primary Examiner*—Peter Szekely
(74) *Attorney, Agent, or Firm*—Cantor Colburn LLP

(57) ABSTRACT

Disclosed herein are effect pigment PVC plastisol, uses thereof, and proceses for producing effect pigment PVC plastisol. In one embodiment, an effect pigment PVC plastisol comprises: (A) at least one finely divided PVC homopolymer having particle sizes of from 0.04 to 40 μm, and which as a dispersion in a plasticizer exhibits dilatancy, (B) at least one finely divided PVC homopolymer having particle sizes of from 1 to 400 μm, and which as a dispersion in a plasticizer exhibits pseudoplasticity, (C) at least one plasticizer, and (D) at least one effect pigment.

18 Claims, No Drawings

PVC PLASTISOLS COMPRISING EFFECT PIGMENTS, THEIR PREPARATION AND USE IN COIL COATING

CROSS REFERENCE TO RELATED APPLICATIONS

This application is a National Phase Application of Patent Application PCT/EP2005/050944 filed on Feb. 23, 2005, which claims priority to GB0404588.6 filed on Mar. 1, 2004.

BACKGROUND OF THE INVENTION

The present invention relates to novel PVC plastisols comprising effect pigments. The present invention also relates to a new process for preparing PVC plastisols comprising effect pigments. The present invention further relates to the use of the novel PVC plastisols comprising effect pigments and of the PVC plastisols comprising effect pigments prepared by the novel process in coil coating for producing effect coatings and also color and effect coatings.

PVC plastisols are colloidal dispersions of polyvinyl chloride (PVC) prepared by emulsion or microemulsion polymerization in plasticizers. When the PVC plastisols are heated the plasticizers diffuse into the dispersed polymer particles, where they lodge between the macromolecules and hence produce plasticization of the PVC plastisols. After cooling, highly elastic, abrasion-resistant, and dimensionally stable coatings are obtained.

In automotive OEM finishing PVC plastisols further comprising pigments, fillers, and heat stabilizers are used as additional coatings to counter mechanical damage and corrosion in areas of particular risk of stone chipping (underbody, wheel arches) and for sealing weld seams (seam sealing). Application is normally manual or via special spraying techniques. The temperatures of curing (gelling) are generally situated between 140 and 180° C.

(Cf. Römpp Online, Georg Thieme Verlag, Stuttgart, N.Y. 2003, "PVC plastisols").

PVC plastisols comprising effect pigments, such as platelet-shaped aluminum effect pigments or interference pigments, are known per se. They normally comprise a standard PVC paste resin and a PVC extender resin. The known PVC plastisols comprising effect pigments are suitable for coil coating.

Coil coating is a special form of the roll coating (Römpp Lexikon Lacke und Druckfarben, Georg Thieme Verlag, Stuttgart, N.Y., 1998, page 617, "roll coating") and, occasionally, of the spray coating and flow coating of metal strips ("coils") with liquid coating materials. It is a continuous process: all worksteps, such as cleaning, pretreatment, coating, and curing, etc., are carried out in one operation on one line. Schematically, coil coating embraces the following steps: cleaning and degreasing of the coil are followed by a multistage chemical pretreatment with subsequent passivation, rinsing and drying. The coils used are in particular of steel, such as galvanized steel, or aluminum. Cooling of the coils is followed by application of the liquid coating material to one or both sides using two or three rolls, usually by the reverse roller-coating method. After a very short evaporation time the film applied is cured thermally at temperatures from 180 to 260° C. for 20 to 60 s. Where a multicoat paint system is being produced, application and cure are repeated. The speeds of coil coating of lines are up to 250 m/min (Römpp Lexikon Lacke und Druckfarben, Georg Thieme Verlag, Stuttgart, N.Y., 1998, page 55, "coil coating").

Since the processing of the metal does not take place until after the coating operation, the resultant coatings need to have extremely high mechanical integrity. The coated coils are used customarily in the architectural sector for producing ceiling and wall elements, doors, pipe insulation, roller shutters or window profiles, in the vehicle sector for producing paneling for caravans or truck bodies, and in the household sector for producing profile elements for washing machines, dishwashers, freezers, ice boxes or ranges (cf. Römpp Lexikon Lacke und Druckfarben, Georg Thieme Verlag, Stuttgart, N.Y., 1998, "coil coating", page 55, and "coil coating materials", page 116).

In the coatings produced from the known PVC plastisols comprising platelet-shaped effect pigments, however, the platelet-shaped effect pigments are not oriented predominantly or exclusively parallel to the surface of the coatings, with the consequence that the desired optical effect of the platelet-shaped effect pigments does not come about in the coatings, or not to the required extent. Thus with platelet-shaped aluminum effect pigments, for example, only coatings with glitter effects can be produced, but not coatings exhibiting a strong color flop or light/dark flop, such as is characteristic of high-grade metallic paint systems.

The use of PVC plastisols comprising effect pigments and of the inherently advantageous coil coating process for producing high-grade effect coatings, or color and effect coatings, for automotive OEM finishing has therefore been unsuccessful to date essentially owing to the fact that the existing coatings comprising effect pigments even prior to deformation do not have the required automobile quality. In particular it is not possible to reproduce the shades and optical effects the automobile industry requires, or the required gloss and overall appearance.

SUMMARY OF THE INVENTION

Disclosed herein are effect pigment PVC plastisol, uses thereof, and processes for producing effect pigment PVC plastisol. In one embodiment, an effect pigment PVC plastisol comprises: (A) at least one finely divided PVC homopolymer having particle sizes of from 0.04 to 40 µm, and which as a dispersion in a plasticizer exhibits dilatancy, (B) at least one finely divided PVC homopolymer having particle sizes of from 1 to 400 µm, and which as a dispersion in a plasticizer exhibits pseudoplasticity, (C) at least one plasticizer, and (D) at least one effect pigment.

It is an object of the present invention to provide novel PVC plastisols comprising effect pigments, especially platelet-shaped effect pigments, which no longer have the disadvantages of the prior art, which are easy to prepare, and which are preferentially suitable for coil coating.

The novel PVC plastisols comprising effect pigments, especially platelet-shaped effect pigments, are intended to produce novel coatings comprising effect pigments, especially platelet-shaped effect pigments, in which the effect pigments, especially the platelet-shaped effect pigments, are oriented predominantly or exclusively parallel to the surface of the coatings, so that the desired optical effect of the effect pigments, in particular of the platelet-shaped effect pigments, comes about in the coatings to the required extent.

In particular it is intended that the novel coatings comprising platelet-shaped effect pigments should exhibit a strong color flop or light/dark flop, such as is characteristic of high-grade metallic finishes.

Overall the intention is that the novel PVC plastisols comprising effect pigments, especially platelet-shaped effect pigments, should allow the shades and optical effects the automobile industry requires, and also the required gloss and overall appearance, to be reproduced.

The invention accordingly provides the novel effect pigment PVC plastisols comprising (A) at least one finely divided PVC homopolymer having particle sizes of from 0.04 to 40 µm which as a dispersion in a plasticizer exhibits dilatancy,
(B) at least one finely divided PVC homopolymer having particle sizes of from 1 to 400 µm which as a dispersion in a plasticizer exhibits pseudoplasticity,
(C) at least one plasticizer, and
(D) at least one effect pigment and referred to below as "PVC plastisols of the invention".

The invention further provides the novel process for producing effect pigment PVC plastisols which involves at least mixing (A) at least one finely divided PVC homopolymer having particle sizes of from 0.5 to 40 µm which as a dispersion in a plasticizer exhibits dilatancy,
(B) at least one finely divided PVC homopolymer having particle sizes of from 1 to 400 µm which as a dispersion in a plasticizer exhibits pseudoplasticity,
(C) at least one plasticizer, and
(D) at least one effect pigment with one another and homogenizing the resulting mixture, and which is referred to below as "process of the invention".

Further subject matter of the invention will emerge from the description.

In the light of the prior art it was surprising and unforeseeable for the skilled worker that the object on which the present invention was based could be achieved by means of the PVC plastisols of the invention and of the process of the invention.

In particular it was surprising that the PVC plastisols of the invention were easy to prepare and were preferentially suitable for coil coating.

The PVC plastisols of the invention gave novel coatings comprising effect pigments, especially platelet-shaped effect pigments, in which the effect pigments, especially the platelet-shaped effect pigments, were oriented predominantly or exclusively parallel to the surface of the coatings, thereby producing the desired optical effect of the effect pigments, in particular of the platelet-shaped effect pigments, in the coatings of the invention to the required extent.

In particular the coatings of the invention exhibited a strong color flop or light/dark flop characteristic of high-grade metallic finishes.

All in all the PVC plastisols of the invention allow reproduction of the shades and optical effects the automobile industry requires and also of the required gloss and overall appearance.

Dilatancy means that the viscosity of a sheared PVC plastisol responds to an increase in shear rate by likewise increasing.

Pseudoplasticity means that the viscosity of a sheared PVC plastisol responds to an increase in shear rate by decreasing.

(Cf. in this regard Bruno Vollmert, "Grundriss der Makromolekularen Chemie", E. Vollmert-Verlag, Karlsruhe, 1979, vol. IV, "Macromolecular aggregate states", "4.3.1 Viscosity as a function of flow gradient", pages 77 to 82.)

The PVC plastisols of the invention comprise at least one, especially one, finely divided PVC homopolymer (A) which is preferably preparable by emulsion polymerization or microemulsion polymerization.

The finely divided PVC homopolymer (A) has particle sizes of from 0.5 to 40 µm, preferably from 0.5 to 30 µm, and in particular from 0.5 to 20 µm. The particle size distribution can be monomodal or multimodal, especially bimodal. In the case of a monomodal particle size distribution the maximum lies preferably between particle sizes of from 1.5 to 15 µm, in particular between 2 and 10 µm. In the case of a bimodal particle size distribution the maxima lie preferably between particle sizes of from 1 to 4 µm, in particular from 1.5 to 3 µm, and from 4 to 15 µm, in particular from 6 to 15 µm.

As a PVC plastisol the finely divided PVC homopolymer (A) exhibits dilatancy.

The finely divided PVC homopolymers (A) are commercial products and are sold by, for example, the company Pevikon, Norway, under the brand name Pevikon®, especially Pevikon® 1510.

The amount of finely divided PVC homopolymer (A) in the PVC plastisols of the invention may vary widely and is guided by the requirements of the case in hand. The PVC plastisols of the invention, based on their total amount, contain preferably from 20 to 60% by weight, more preferably from 25 to 55% by weight, and in particular from 30 to 50% by weight of finely divided PVC homopolymer (A).

The PVC plastisols of the invention comprise at least one, especially one, finely divided PVC homopolymer (B) which is preparable preferably by emulsion polymerization.

The finely divided PVC homopolymer (B) has particle sizes of from 1 to 400 µm, preferably from 1 to 300 µm and in particular from 1 to 200 µm. The particle size distribution can be monomodal or multimodal, especially monomodal. In the case of a monomodal particle size distribution the maximum preferably lies between particle sizes of 10 and 100 µm, in particular between 10 and 60 µm.

As a PVC plastisol the finely divided PVC homopolymer (B) exhibits pseudoplasticity.

The finely divided PVC homopolymers (B) are commercial products and sold by, for example, the company Pevikon, Norway, under the brand name Pevikon®, especially Pevikon® 709.

The amount of finely divided PVC homopolymer (B) in the PVC plastisols of the invention may vary widely and is guided by the requirements of the case in hand. The PVC plastisols of the invention, based on their total amount, contain preferably from 5 to 30% by weight, more preferably from 5 to 25% by weight, and in particular from 10 to 20% by weight of finely divided PVC homopolymer (B).

The weight ratio of finely divided PVC homopolymer (A) to finely divided PVC homopolymer (B) may vary very widely. The weight ratio (A):(B) is preferably chosen so that the PVC plastisols of the invention exhibit pseudoplasticity. The weight ratio (A):(B) is preferably from 5:1 to 1:5, more preferably from 4:1 to 1:1, and in particular from 3:1 to 1.5:1.

The PVC plastisols of the invention comprise at least one plasticizer (C) and preferably at least two, more preferably at least three, and in particular three plasticizers (C). The plasticizers (C) preferably come from different classes of compound. Suitable plasticizers are all those commonly used for PVC. Examples of suitable plasticizers are described by Werner Sommer in "Taschenbuch der Kunststoff-Additive", R. Gächter and H. Müller (eds.), Carl Hanser Verlag, Munich, Vienna, 1983, "5 plasticizers", pages 261 to 307. The plasticizers (C) are preferably selected from the group consisting of phenolic esters, adipic esters, and butyric esters.

The amount of plasticizers (C) in the PVC plastisols of the invention may vary very widely and is guided by the requirements of the case in hand, in particular by their plasticizing effect on the finely divided PVC homopolymers (A) and (B). The amount is preferably from 10 to 60% by weight, more preferably from 15 to 50% by weight, and in particular from 20 to 40% by weight, based in each case on the total amount of a PVC plastisol of the invention.

The plastisols of the invention comprise at least one effect pigment (D), in particular a platelet-shaped effect pigment (D).

The effect pigments (D) are preferably selected from the group consisting of organic and inorganic, optical effect, color effect and optical effect, magnetically shielding, electrically conductive, anticorrosion, fluorescent, and phosphorescent pigments, more preferably from the group consisting of organic and inorganic, optical effect, and color effect and optical effect pigments, and in particular from the group consisting of metal effect pigments, effect pigments composed of metals and nonmetals, and nonmetallic effect pigments.

The metal effect pigments (D) are, in particular, aluminum effect pigments, iron effect pigments or copper effect pigments, such as commercial aluminum bronzes, aluminum bronzes chromated as in DE 36 36 183 A 1, commercial stainless steel bronzes, and commercial copper bronzes.

The effect pigments (D) composed of metals and nonmetals are, in particular, platelet-shaped aluminum pigments coated with iron oxide, as described in, for example, European patent application EP 0 562 329 A 2; glass flakes coated with metals, especially aluminum; or interference pigments which include a reflector layer of metal, especially aluminum, and show a strong color flop, as described in, for example, American patents U.S. Pat. No. 4,434,010 A 1, U.S. Pat. No. 4,704,356 A 1, U.S. Pat. No. 4,779,898 A 1, U.S. Pat. No. 4,838,648 A 1, U.S. Pat. No. 4,930,866 A 1, U.S. Pat. No. 5,059,245 A 1, U.S. Pat. No. 5,135,812 A 1, U.S. Pat. No. 5,171,363 A 1 or U.S. Pat. No. 5,214,530 A 1.

The nonmetallic effect pigments (D) are, in particular, pearlescent pigments, especially micapigments, as described in, for example, Merck Kontakte, 1992, issue 2, pages 3 to 60; platelet-shaped graphite pigments coated with metal oxides, as described in, for example, Japanese patent application JP 5-311098 A; interference pigments without a metal reflector layer but exhibiting a strong color flop, as described in, for example, American patents U.S. Pat. No. 4,434,010 A 1, U.S. Pat. No. 4,704,356 A 1, U.S. Pat. No. 4,779,898 A 1, U.S. Pat. No. 4,838,648 A 1, U.S. Pat. No. 4,930,866 A 1, U.S. Pat. No. 5,059,245 A 1, U.S. Pat. No. 5,135,812 A 1, US. Pat. No. 5,171,363 A 1 or U.S. Pat. No. 5,214,530 A 1; platelet-shaped effect pigments based on iron oxide and having a shade ranging from pink to brownish red, as described in, for example, the patent applications and patents DE 36 36 156 A 1, DE 37 18 446 A 1, DE37 19 804 A1, DE39 30 601 A1, EP0 068 311 A1, EP0 264 843 A1, EP 0 265 820 A 1, EP 0 283 852 A 1, EP 0 293 746 A 1, EP 0 417 567 A 1, U.S. Pat. No. 4,828,826 A or U.S. Pat. No. 5,244,649 A; or organic, liquid-crystalline effect pigments.

For further details refer to Römpp Lexikon Lacke und Druckfarben, Georg Thieme Verlag, 1998, pages 176, "effect pigments" and pages 380 and 381, "metal oxide-mica pigments" to "metal pigments".

Examples of fluorescent and phosphorescent pigments (D) (daylight-fluorescent pigments) are bis(azomethine) pigments.

Examples of suitable electrically conductive pigments (D) are titanium dioxide/tin oxide pigments and pulverulent metal pigments.

Examples of magnetically shielding pigments (D) are pigments based on iron oxides or chromium dioxide.

Examples of suitable anticorrosion pigments (D) are zinc powders, lead silicates, zinc phosphates or zinc borates.

Owing to the multiplicity of suitable effect pigments (D) the PVC plastisols of the invention ensure a universal breadth of use and allow production of an extraordinarily wide diversity of coatings with a very wide variety of physical effects.

The amount of effect pigments (D) in the PVC plastisols of the invention may vary very widely and is guided by the requirements of the case in hand, in particular by the intensity of the effect it is intended to produce in the coatings of the invention. The effect pigments (D) are preferably used in the conventional, effective amounts.

The PVC plastisols of the invention may further comprise at least one pigment (E) which is different than the effect pigments (D) and is selected from the group consisting of organic and inorganic, color and extender pigments, pigments which combine at least two of these properties, and nanoparticles, provided such an additional pigment does not adversely affect the performance properties of the PVC plastisols of the invention.

Examples of suitable inorganic color pigments (E) are white pigments such as zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

Examples of suitable organic color pigments (E) are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details refer to Römpp Lexikon Lacke und Druckfarben, Georg Thieme Verlag, 1998, pages 180 and 181, "iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459, "polycyclic pigments", page 52, "azomethine pigments", "azo pigments", and page 379, "metal complex pigments".

Examples of suitable extender pigments or fillers (E) are chalk, calcium sulfate, barium sulfate, silicates such as talc or kaolin, silicas, oxides such as aluminum hydroxide or magnesium hydroxide or organic fillers such as textile fibers, cellulose fibers, polyethylene fibers or polymer powders; for further details refer to Römpp Lexikon Lacke und Druckfarben, Georg Thieme Verlag, 1998, pages 250 ff., "fillers".

The nanoparticles (E) are preferably selected from the group consisting of main group and transition group metals and their compounds. The main group and transition group metals are preferably selected from metals of main groups three to five, transition groups three to six, and transition groups 1 and 2 of the periodic table of the elements, and also the lanthanides. Particular preference is given to using boron, aluminum, gallium, silicon, germanium, tin, arsenic, antimony, silver, zinc, titanium, zirconium, hafnium, vanadium, niobium, tantalum, molybdenum, tungsten, and cerium, especially aluminum, silicon, silver, cerium, titanium, and zirconium. The compounds of the metals are preferably the oxides, oxide hydrates, sulfates or phosphates. Used with preference are silver, silica, alumina, hydrated alumina, titanium dioxide, zirconium oxide, cerium oxide, and mixtures thereof, more preferably silver, cerium oxide, silica, hydrated alumina, and mixtures thereof, very preferably hydrated alumina, and in particular boehmite. The nanoparticles preferably have a primary particle size <50 nm, more preferably from 5 to 50 nm, in particular from 10 to 30 nm.

The PVC plastisols of the invention may further comprise at least one, in particular at least two, additive(s) (F) such as is or are commonly used in PVC. The additives (F) are preferably selected from the group consisting of PVC stabilizers, light stabilizers, organic solvents, especially high-boiling organic solvents, and synergists for halogen flame retardants. Examples of suitable PVC stabilizers and light stabilizers are described in "Taschenbuch der Kunststoff-Additive", R. Gächter and H. Müller (eds.), Carl Hanser Verlag, Munich, Vienna, 1983, "4 PVC stabilizers", pages 199 to 260. Further suitable PVC stabilizers are epoxy stabilizers. One suitable high-boiling organic solvent is butyl diglycol acetate. One suitable synergist for halogen flame retardants is antimony trioxide. The additives (F) are used in the conventional, effective amounts.

The preparation of the PVC plastisols of the invention has no peculiarities in terms of method but instead takes place by the mixing of the above-described constituents (A), (B), (C), and (D) and also, where used, (E) and/or (F). This can be done using mixing equipment, such as stirred tanks, dissolvers, including inline dissolvers, bead mills, agitator mills, static mixers, toothed-wheel dispersers or extruders.

The PVC plastisols of the invention are outstandingly suitable for use as coil coating materials. Coil coating starts from a metal strip (the coil) which has been conventionally cleaned, degreased, passivated, chemically treated, rinsed, and dried. The metal coil can be coated on one or both sides.

Suitable metals are all those from which it is possible to form coils able to withstand the mechanical, chemical, and thermal stresses of coil coating. Highly suitable metal coils include those based on aluminum or iron. In the case of iron particular suitability is possessed by cold-rolled steels, electrolytically galvanized steels, hot-dip-galvanized steels or stainless steels. The coils are preferably from 200 μm to 2 mm thick.

For coil coating the metal coil runs through a coil coating line as described in, for example, Römpp Lexikon Lacke und Druckfarben, Georg Thieme Verlag, Stuttgart, N.Y., 1998, page 55, "coil coating", or German patent application DE 196 32 426 A 1, at a speed adapted to the application and curing properties of the inventive PVC plastisols employed. The speed may therefore vary very widely from one coating operation to another. It is preferably from 10 to 150 m/min, more preferably from 12 to 120 m/min, with particular preference from 14 to 100 m/min, very preferably from 16 to 80 m/min, and in particular from 20 to 70 m/min.

The PVC plastisols of the invention can be applied in any way, by spraying, flow coating or roll coating, for example. Among these application techniques, roll coating is particularly advantageous and is therefore used with preference in accordance with the invention.

Each application step in roll coating can be conducted with two or more rolls. Preference is given to employing from two to four rolls, and especially two rolls.

In the case of roll coating the rotating pick-up roll dips into a reservoir of the PVC plastisol of the invention and so picks up the paint to be applied. This paint is transferred from the pick-up roll to the rotating application roll directly or via at least one transfer roll. The paint is stripped from this application roll and so transferred to the coil as it runs in the same or opposite direction.

As an alternative the PVC plastisol of the invention can be pumped directly into a gap between two rolls, this being referred to by those in the art as nip feed.

In accordance with the invention, transfer by reverse stripping, or the reverse roller coating technique, is of advantage and is therefore employed with preference.

In the case of roll coating the circumferential speeds of the pick-up roll and the application roll may vary very greatly from one coating operation to another. The application roll preferably has a circumferential speed which is from 110 to 125% of the coil speed, and the pick-up roll a circumferential speed which is from 20 to 40% of the coil speed.

The PVC plastisols of the invention are preferably applied in a wet film thickness such that curing of the applied films results in coatings having a dry film thickness of from 50 to 300 μm, more preferably from 100 to 200 μm, very preferably from 100 to 150 μm and in particular from 110 to 130 μm.

The above-described application methods can also be employed for the coating materials with which the coatings of the invention are overcoated, unless said coating materials are powder coating materials, in which case the usual special application methods are employed, such as electrostatic powder spraying in the case of coils traveling at slow speed or the powder cloud chamber process, as it is known, in the case of high-speed coils.

Heating of the films of the PVC plastisols of the invention in the case of thermal curing is accomplished preferably by convection heat transfer, irradiation with near or far infrared and/or, in the case of iron-based coils, by electrical induction. The maximum substrate temperature or PMT is preferably at most 200° C., more preferably 180° C., and in particular at most 160° C. It is a very particular advantage of the PVC plastisols of the invention and of the coating processes of the invention that comparatively low temperatures can be employed and yet result in coatings of the invention having outstanding performance properties.

The heating time, i.e., the duration of thermal cure or gelling, varies depending on the particular inventive PVC plastisol employed. The time is preferably from 10 s to 2 min.

Where essentially convection heat transfer is employed the need is for forced-air ovens with a length of from 30 to 50 m, in particular from 35 to 45 m, at the preferred coil speeds. The forced-air temperature is preferably below 300° C., in particular below 280° C.

Where two or more coating materials are applied during coil coating this is done on a correspondingly configured line in which two or more application stations and, where appropriate, curing stations are connected up in series. Alternatively, following the application and curing of the first coating material, e.g., of the PVC plastisol of the invention, the coated coil is wound up again and then provided on one or both sides on a second, third, etc. coil coating line with second, third, etc., coatings.

After the coated coils of the invention have been produced they can be wound up and then processed further at a different place; alternatively they can be processed further directly as they come from the coil coating operation. Thus they may be laminated with plastics or provided with removable protective sheets. Following a reduction in size they can be machine-shaped into parts of appropriate size. Examples of suitable machine shaping methods include pressing and deep drawing.

The resultant coils, profile elements, and shaped parts of the invention are scratch-resistant, stable to corrosion, stable to weathering, and stable to chemicals and can be overcoated readily with any of a wide variety of coating materials. It is surprising that no pretreatment of the metal coils with chromate is necessary in order to achieve excellent corrosion protection.

In particular, however, the coils, profile elements, and shaped parts of the invention exhibit outstanding, intensive optical effects, especially intensive color flops and light/dark flops, which are comparable with those of conventional basecoats such as are used for high-quality automotive OEM finishing.

The coils coated with the coatings of the invention are therefore outstandingly suitable for applications in automobile construction, for producing, for example, bodywork parts and bodies, including commercial vehicle bodies and paneling for caravans, in the domestic appliance sector for the purpose, for example, of producing washing machines, dishwashers, dryers, ice boxes, freezers or ranges, in the lighting sector for producing lamps for interior and exterior use, or in the architectural sector, both indoors and outdoors, for the purpose, for example, of producing ceiling and wall elements, doors, gates, pipe insulation, roller shutters or window profiles.

INVENTIVE AND COMPARATIVE EXAMPLES

Examples 1 to 3 (Inventive) and C1 to C3 (Comparative)

The Preparation of PVC Plastisols 1 to 3 (Examples 1 to 3) and C1 to C3 (Examples C1 to C3)

The PVC plastisols 1 to 3 were prepared by mixing the ingredients indicated in table 1 in the amounts specified therein and homogenizing the resulting mixtures.

TABLE 1

The physical composition of PVC plastisols 1 to 3 of examples 1 to 3

| Ingredient | Amount (parts by weight) in example: | | |
|---|---|---|---|
| | 1 | 2 | 3 |
| PVC homopolymer (A): | | | |
| Pevikon ® 1510 from Pevikon, Norway | 70 | 70 | 70 |
| PVC homopolymer (B): | | | |
| Pevikon ® 709 from Pevikon, Norway | 30 | 30 | 30 |
| Plasticizers (C): | | | |
| Mesamoll ® (commercial alkylsulfonic ester of phenol from Bayer Aktiengesellschaft) | 10 | 10 | 10 |
| Plastomoll ® DNA (commercial diisononyl adipate from BASF AG) | 30 | 30 | 30 |
| TXIB ® (commercial 2,2,4-trimethyM ,3-pentanediol diisobutyrate from Eastman) | 10 | 10 | 10 |
| Effect pigment (D): | | | |
| STAPA ® VP 54277/G/80 (commercial 80 percent aluminum effect pigment paste from Eckhart) | 4 | — | — |
| Iriodin ® Ultra Blau (commercial mica pigment from Merck) | — | 6.5 | — |
| Variocrom ® Magic Purple (commercial interference pigment from BASF AG) | — | — | 7 |
| Pigment (E): | | | |
| Irgalit ® BLPO (commercial blue pigment, 20 percent in TXIB/diisononyl adipate) | 3.32 | 4 | — |

TABLE 1-continued

The physical composition of PVC plastisols 1 to 3 of examples 1 to 3

| Ingredient | Amount (parts by weight) in example: | | |
|---|---|---|---|
| | 1 | 2 | 3 |
| Printex ® 140 W (commercial black pigment, 10 percent in diisononyl adipate) | — | 0.2 | — |
| Irgalit ® GLN (commercial green pigment, 25 percent in TXIB/diisononyl adipate) | — | — | 2 |
| Additive (F): | | | |
| Lankromark ® LZC 330 (commercial calcium/zinc PVC stabilizer from Akcros Chemicals) | 4 | 4 | 4 |
| ERL-4221 (commercial cycloaliphatic epoxy resin from Dow Chemicals) | 4 | 4 | 4 |
| Sanduvor ® VSU (commercial light stabilizer based on oxanilide from Clariant) | 0.3 | 0.3 | 0.3 |
| Butyl diglycol acetate | 10 | 10 | 10 |

PVC plastisols 1 to 3 were outstandingly suitable for use as coil coating materials.

The PVC plastisols C1 to C3 were prepared by mixing the ingredients indicated in table 2 in the amounts specified therein and homogenizing the resulting mixtures.

TABLE 2

The physical composition of PVC plastisols C1 to C3 of examples C1 to C3

| Ingredient | Amount (parts by weight) in example: | | |
|---|---|---|---|
| | C1 | C2 | C3 |
| Standard PVC paste resin: | | | |
| Pevikon ® 1412 from Pevikon, Norway | 52 | 52 | 52 |
| PVC extender resin: | | | |
| Vinnolit ® C 65 V from Vinnolit | 24 | 24 | 24 |
| Vinnolit ® C 100 V from Vinnolit | 24 | 24 | 24 |
| Plasticizers (C): | | | |
| Mesamoll ® | 12 | 12 | 12 |
| Plastomoll ® DNA | 7 | 7 | 7 |
| TXIB ® | 18 | 18 | 18 |
| Dioplex ® 7017 (commercial polymeric plasticizer from Hyperlast) | 4 | 4 | 4 |
| Effect pigment (D): | | | |
| STAPA ® VP 54277/G/80 (commercial 80 percent aluminum effect pigment paste from Eckhart) | 4 | — | — |
| Iriodin ® Ultra Blau (commercial mica pigment from Merck) | — | 6.5 | — |
| Variocrom ® Magic Purple (commercial interference pigment from BASF AG) | — | — | 7 |
| Pigment (E): | | | |
| Irgalit ® BLPO (commercial blue pigment, 20 percent in TXIB/diisononyl adipate) | 3.32 | 4 | — |
| Printex ® 140 W (commercial black pigment, 10 percent in diisononyl adipate) | — | 0.2 | — |
| Irgalit ® GLN (commercial green pigment 25 percent in TXIB/diisononyl adipate) | — | — | 2 |

TABLE 2-continued

The physical composition of PVC plastisols C1 to C3 of examples C1 to C3

| Ingredient | Amount (parts by weight) in example: | | |
|---|---|---|---|
| | C1 | C2 | C3 |
| Additive (F): | | | |
| Lankromark ® LZC 330 (commercial calcium/zinc PVC stabilizer from Akcros Chemicals) | 3 | 3 | 3 |
| ERL-4221 (commercial cycloaliphatic epoxy resin from Dow Chemicals) | 3 | 3 | 3 |
| Sanduvor ® VSU (commercial light stabilizer based on oxanilide from Clariant) | 0.3 | 0.3 | 0.3 |
| Butyl diglycol acetate | 12 | 12 | 12 |
| Antimony trioxide | 4 | 4 | 4 |

PVC plastisol C1 served as comparison to PVC plastisol 1. PVC plastisol C2 served as comparison to PVC plastisol 2. PVC plastisol C3 served as comparison to PVC plastisol 3.

Examples 4 to 6 (Inventive) and C4 to C6 (Comparative)

The Production of Effect Pigment Coatings 1 to 3 (Examples 4 to 6) and C1 to C3 (Examples C4 to C6)

Coatings 1 to 3 of examples 4 to 6 and coatings C1 to C3 of examples C4 to C6 were produced using the PVC plastisols specified in table 3.

TABLE 3

Overview of the PVC plastisols used in examples 4 to 6 and examples C4 to C6

| Example | Coating | PVC plastisol | Example |
|---|---|---|---|
| 4 | 1 | 1 | 1 |
| 5 | 2 | 2 | 2 |
| 6 | 3 | 3 | 3 |
| C4 | C1 | C1 | C1 |
| C5 | C2 | C2 | C2 |
| C6 | C3 | C3 | C3 |

The PVC plastisols were applied to metal test panels by roll application so that gelling of the applied PVC plastisol films at 220° C. (PMT, peak metal temperature) for 40 seconds gave coatings having a film thickness of 120 μm.

In contrast to coatings C1 to C3 coatings 1 to 3 showed pronounced intensive light/dark flops (coating 1) or pronounced intensive color flops (coatings 2 and 3), a fact which was underlined by means of colorimetry (CIELAB color space). The relevant measurements are given in tables 4, 5 and 6.

TABLE 4

Colorimetric comparison of coatings 1 and C1 (CIELAB color space/illuminant: D65/color difference mode: weighted color coordinates/color difference formula: Audi)

Coating C1

| Angle | L* | a* | b* | C* | h* |
|---|---|---|---|---|---|
| 15 | 79.4 | −6.0 | −11.2 | 12.7 | 242.1 |
| 25 | 63 | −7.8 | −13.6 | 15.7 | 240 |

TABLE 4-continued

Colorimetric comparison of coatings 1 and C1 (CIELAB color space/illuminant: D65/color difference mode: weighted color coordinates/color difference formula: Audi)

| 45 | 46.2 | −8.9 | −16.5 | 18.8 | 241.6 |
| 75 | 37 | −10.2 | −19.6 | 22.1 | 242.6 |

Coating 1

| Angle | dL' | da' | db' | dC' | dH' | dE' | mDE' |
|---|---|---|---|---|---|---|---|
| 15 | 5.3 | −14 | −11 | 17.2 | −4.8 | 18.6 | 14.2 |
| 25 | 5.7 | −14 | −11.8 | 17.8 | −4.3 | 19.1 | |
| 45 | −1 | −4.4 | −4.5 | 6.1 | −1.5 | 6.4 | |
| 75 | −11 | 5.2 | 3.2 | −5 | 3.6 | 12.6 | |

TABLE 5

Colorimetric comparison of coatings 2 and C2 (CIELAB color space/illuminant: D65/color difference mode: weighted color coordinates/color difference formula: Audi)

Coating C2

| Angle | L* | a* | b* | C* | h* |
|---|---|---|---|---|---|
| 15 | 58.7 | −1.4 | −26.7 | 26 | 267 |
| 25 | 40.8 | −4.7 | −32. | 33.1 | 261.8 |
| 45 | 28.3 | −8.8 | −35.4 | 36.5 | 256.1 |
| 75 | 24.7 | −9.3 | −35.5 | 36.7 | 255.3 |

Coating 2

| Angle | dL' | da' | db' | dC' | dH' | dE' | mDE' |
|---|---|---|---|---|---|---|---|
| 15 | 0.7 | 7.1 | 18.3 | 19 | −4.7 | 19.6 | 11.7 |
| 25 | 1.6 | −9.5 | 8.9 | 11 | −7.1 | 13.2 | |
| 45 | −2.4 | −4.7 | 2 | −0.5 | −5 | 5.6 | |
| 75 | −6.6 | −0.1 | 5.4 | −5.1 | −1.6 | 8.5 | |

TABLE 6

Colorimetric comparison of coatings 3 and C3 (CIELAB color space/illuminant: D65/color difference mode: weighted color coordinates/color difference formula: Audi)

Coating C3

| Angle | L* | a* | b* | C* | h* |
|---|---|---|---|---|---|
| 15 | 55.1 | 4 | 3.1 | 5.1 | 37.6 |
| 25 | 35.4 | 5.7 | 1.3 | 5.8 | 13.2 |
| 45 | 20.7 | 4.6 | −2.4 | 5.2 | 332.5 |
| 75 | 16.6 | −1.6 | −3.5 | 3.9 | 246.1 |

Coating 3

| Angle | dL' | da' | db' | dC' | dH' | dE' | mDE' |
|---|---|---|---|---|---|---|---|
| 15 | 2.9 | 37 | 36.9 | 52.3 | 2 | 52.4 | 26.6 |
| 25 | 2.4 | 23.1 | 15.5 | 27.5 | 4.1 | 27.9 | |
| 45 | −1.3 | −1.6 | 8.4 | 1.5 | −8.4 | 8.7 | |
| 75 | −4.4 | −8.5 | 14.6 | 11.1 | −12.7 | 17.4 | |

What is claimed is:

1. An effect pigment PVC plastisol comprising
(A) at least one finely divided PVC homopolymer, prepared by emulsion polymerization or microemulsion polymerization, having particle sizes of from 0.04 to 40 μm, and which as a dispersion in a plasticizer exhibits dilatancy, (B) at least one finely divided PVC homopolymer, prepared by emulsion polymerization, having particle sizes of from 1 to 400 μm, and which as a dispersion in a plasticizer exhibits pseudoplasticity, (C) at least one plasticizer, (D) at least one effect pigment, and (F) at least one additive, wherein the at least one additive (F) comprises an organic solvent, and the weight ratio (A):(B) is chosen so that the PVC plastisol exhibits pseudoplasticity.

2. The PVC plastisol as claimed in claim 1, comprising at least one pigment (E) different than effect pigment (D).

3. The PVC plastisol as claimed in claim 1, comprising from 20 to 60% by weight, based on PVC plastisol, of finely divided PVC homopolymer (A).

4. The PVC plastisol as claimed in claim 1, comprising from 5 to 30% by weight, based on PVC plastisol, of finely divided PVC homopolymer (B).

5. The PVC plastisol as claimed in claim 1, wherein (A):(B)=5:1 to 1:5.

6. The PVC plastisol, as claimed in claim 1 comprising from 10 to 60% by weight, based on PVC plastisol, of plasticizers (C).

7. The PVC plastisol as claimed in claim 1, wherein the effect pigments (D) are selected from the group consisting of organic pigments, inorganic pigments, optical effect pigments, color effect and optical effect pigments, magnetically shielding pigments, electrically conductive pigments, anticorrosion pigments, fluorescent pigments, and phosphorescent pigments.

8. The PVC plastisol as claimed in claim 7, wherein the effect pigments (D) are selected from the group consisting of organic pigments, inorganic pigments, optical effect pigments, and color effect and optical effect pigments.

9. The PVC plastisol as claimed in claim 8, wherein the effect pigments (D) are selected from the group consisting of metal effect pigments, and effect pigments composed of metals and nonmetals.

10. The PVC plastisol as claimed in claim 2 wherein the pigments (E) are selected from the group consisting of organic pigments, inorganic pigments, color pigments, extender pigments, pigments which combine at least two of these properties, and nanoparticles.

11. The PVC plastisol as claimed in claim 1, wherein additives (F) are selected from the group consisting of PVC stabilizers, light stabilizers, organic solvents, and synergists for halogen flame retardants.

12. A process for producing an effect pigment PVC plastisol comprising effect pigments as claimed in claims 1 or 2, which comprises mixing its constituents (A), (B), (C), (D), and (F); or (A), (B), (C), (D), (E), and (F); and homogenizing the resulting mixture.

13. The PVC plastisol as claimed in claim 8, wherein the effect pigments (D) comprise nonmetallic effect pigments.

14. A method of producing an effect coating comprising applying the PVC plastisol of claim 1 onto a metal strip, and thermally curing the PVC plastisol.

15. The PVC plastisol as claimed in claim 1, wherein the plasticizer comprises a phenolic ester.

16. The PVC plastisol as claimed in claim 1, wherein the plasticizer comprises a phenolic ester, an adipic ester, and a butyric ester.

17. An effect pigment PVC plastisol comprising (A) at least one finely divided PVC homopolymer prepared by emulsion polymerization or microemulsion polymerization having particle sizes of from 0.04 to 40 μm, and which as a dispersion in a plasticizer exhibits dilatancy, (B) at least one finely divided PVC homopolymer prepared by emulsion polymerization, having particle sizes of from 1 to 400 μm, and which as a dispersion in a plasticizer exhibits pseudoplasticity, (C) at least one plasticizer, and (D) at least one effect pigment, wherein a coating formed from the PVC plastisol has a difference in $L^*$, when measured at 15° and at 75°, of an absolute value of at least 41.3; a difference in $a^*$, when measured at 15° and at 75°, of an absolute value of at least 15; and a difference in $b^*$, when measured at 15° and at 75°, of an absolute value of at least 5.8.

18. A coil coating composition comprising the PVC plastisol of claim 1.

* * * * *